Patented Feb. 12, 1935

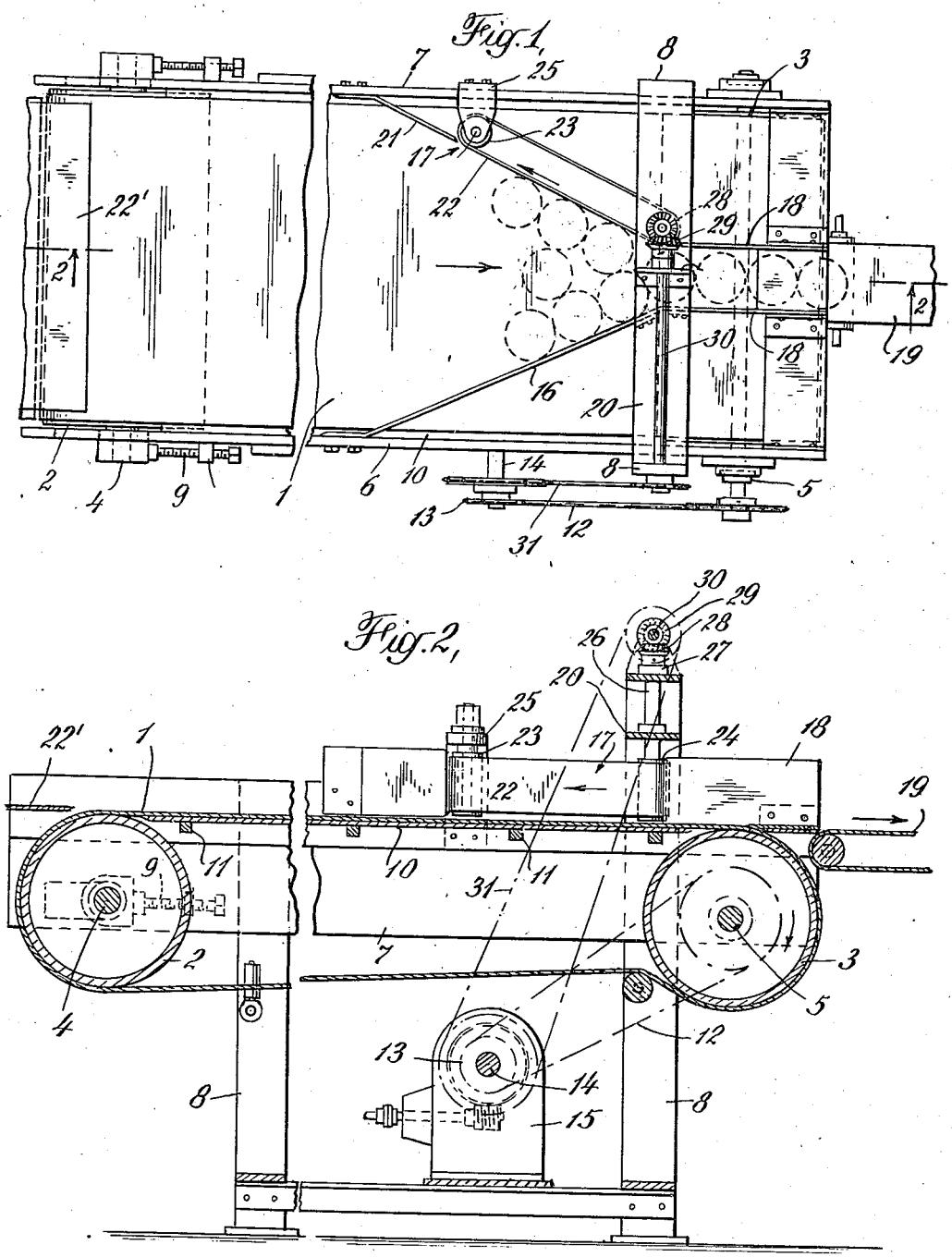

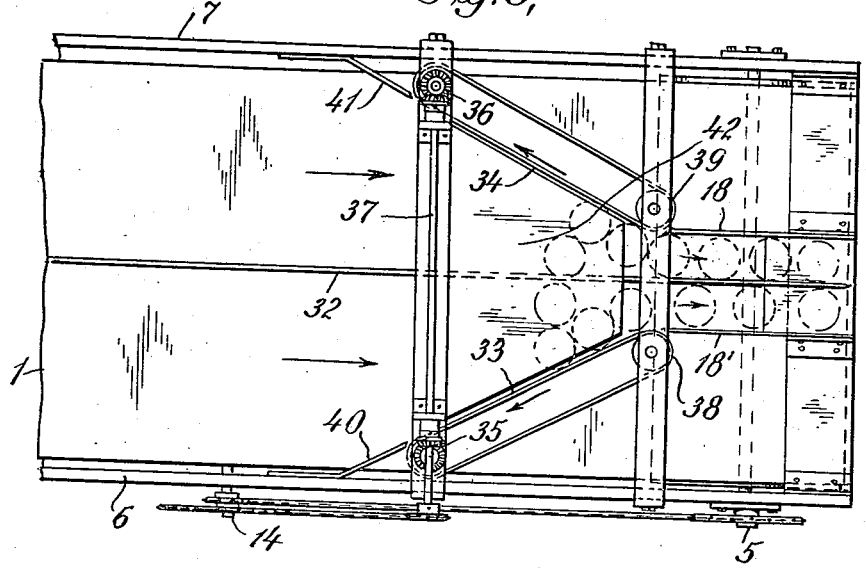
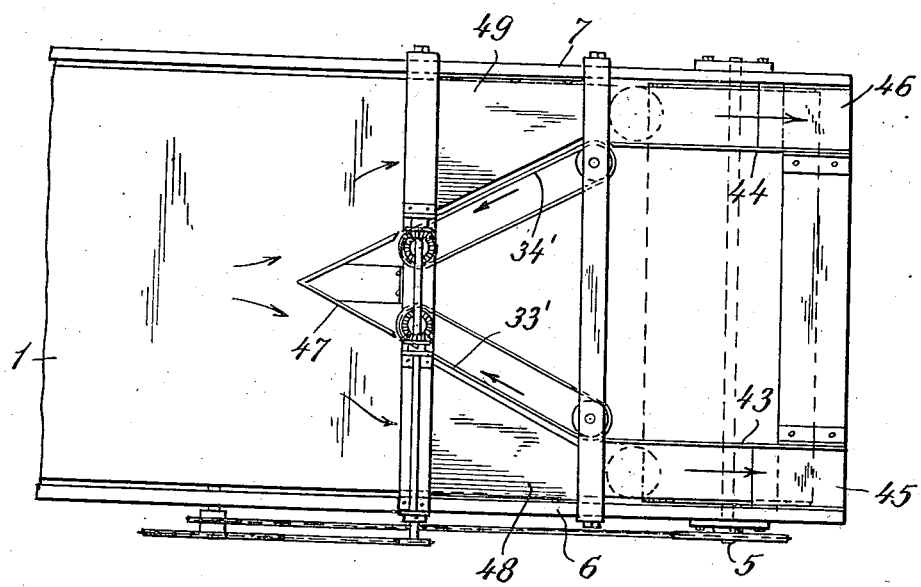

1,990,549

UNITED STATES PATENT OFFICE 1,990,549

ARTICLE HANDLING MACHINE

Wallace D. Kimball, Elmhurst, N. Y., assignor to Standard-Knapp Corporation, Long Island City, N. Y., a corporation of New York Application September 15, 1931, Serial No. 562,924

17 Claims. (Cl. 198—30)

This invention relates to article handling machines, and particularly to a machine upon which cylindrical containers, such for example as tin cans, bottles, jars and the like, may be placed standing on their ends but in haphazard formation, and which will rearrange the articles in column formation for delivery to a labelling or a packing machine, or other point of delivery.

In putting up vegetables and other food stuffs in cans, in accordance with the common method of procedure, the cans are placed in basket-like metal trays holding a single layer of from 25 to 100 cans standing on their ends, the cans being handled in these trays during the cooking and cooling operations. It is also common practice to handle such cans during the cooking operation in large metal baskets holding a hundred or more cans into which the cans are dumped in bulk.

In either case, after the desired periods of cooking and cooling, the metal tray or basket containing the cans is transported by an overhanging conveyor to the labelling or packing department. As the cans have to be fed to the labelling or packing machines in column formation, that is, in one or more single file columns, the cans are taken from the tray or basket and carefully placed in such formation by hand on feed conveyors which carry them to the labelling machine or other destination.

The particular object of the present invention is to provide a machine upon which the cans may be placed standing on their ends but in haphazard formation, and which will automatically form them into one or more columns and deliver them to the labelling machine or other destination.

A further object of the invention is to provide a machine of this sort which will feed the cans continuously without jamming or wedging the cans against one another.

In the accompanying drawings several embodiments of the invention are illustrated, all of which are now in commercial operation.

In these drawings:

Fig. 1 is a plan view of a machine for forming the cans into a single column;

Fig. 2 is a central longitudinal section of the machine taken on line 2—2 of Fig. 1;

Fig. 3 is a plan view of the right hand end of a modified machine for forming two separate groups of cans into two separate columns adjacent one another; and Fig. 4 is a plan view similar to Fig. 3 of another modification for forming a single group of cans into two separate spaced columns.

Referring now to the accompanying drawings, and particularly to Figs. 1 and 2, the machine comprises an endless belt or flexible conveyor, the upper reach of which is horizontal, and which is of preferably a sufficient width to permit a tray of cans to be inverted and the whole layer of cans therein to be placed bodily upon the conveyor, or to have a basket of cans dumped in a pile thereon, the cans thereafter being turned into upright position by hand. Also, if desired, the cans may be removed directly from the trays or baskets by hand and placed on the conveyor, or, particularly where the cans are held in bulk in the basket, they may be discharged on a suitable table or hopper in a pile from which they are taken by hand and placed on the feed conveyors. The conveyor 1 is carried by rollers or drums 2 and 3 which are mounted on shafts 4 and 5 respectively.

The machine framework comprises longitudinally extending side frames 6 and 7 which are supported by four uprights 8. The roller shafts 4 and 5 rotate in journals mounted near the ends of the side frames 6, and the journals of shaft 4 are slidably mounted and provided with adjusting screws 9 for obtaining the proper tension in the flexible conveyor 1.

In order to assist the conveyor in supporting the weight of the cans, a supporting plate 10 is mounted close beneath the upper reach of the conveyor upon cross members 11 which are fixed to the side members 6. Conveyor 1 is moved in the direction of the arrows shown in Fig. 1 by means of a chain 12 which passes over a sprocket on the end of shaft 5 and is driven by sprocket 13 mounted on the end of shaft 14 of the worm gear speed reducing mechanism 15. A motor (not shown) is arranged to drive the worm shaft of the speed reducing mechanism.

The side frames 6 and 7 extend above the surface of the upper reach of the conveyor 1 far enough to serve as guides for keeping the cans on the conveyor. The cans are carried forward toward the right by the conveyor and as they advance are moved toward the center thereof by the deflectors 16 and 17 until they are reduced to a single line or column between the narrowly spaced delivery guides 18. The conveyor delivers this column to a feed conveyor 19 by which they are transported to the labeling machine or other destination. Deflector 16 is a stationary bar mounted in closely spaced relation to the upper surface of conveyor 1 and fixed at its outer end to the side frame 6 and at its inner end to a horizontal cross member 20 extending crosswise of the machine between extensions of the right hand uprights 8.

The deflector 17 comprises two portions, namely a stationary portion which merely consists of a short deflector bar 21 secured to the side frame 7, and a movable portion which preferably consists of a narrow endless belt 22 of a width about equal to the height of the cans. The deflector belt 22 is carried on two small pulleys 23 and 24 mounted for rotation on vertical axes. Pulley 23 is mounted for rotation in a bracket 25 which is bolted to the side frame 7, and supports the pulley as close to the side frame as is convenient. Pulley 24 serves to drive the deflector belt 22 and for this purpose is fixed to a vertical shaft 26 which is mounted for rotation in bearings carried respectively by the cross member 20 and by a similar cross member 27 mounted above member 20 between the extensions of the right hand uprights 8.

The upper end of shaft 26 is provided with a bevelled gear 28, and meshing with this gear is a similar gear 29 mounted on the end of a horizontal shaft 30 which is carried in bearing brackets that are mounted upon the upper side of cross member 27. Shaft 30 in turn is driven by means of a chain 31 from shaft 14 of the speed reducing gear. These driving connections for the deflector belt 22 are so arranged as to move the outer reach of the belt which is in contact with the cans on conveyor 1 in a direction opposite to the movement of conveyor 1 as shown by the arrows in Figs. 1 and 2. The surface speed of belt 22 is preferably somewhat higher than the linear speed of conveyor 1.

In the operation of the apparatus of the invention, the cans are placed upon the conveyor 1 at such an average rate as to maintain a continuous column of cans in the delivery guides 18 and on the feed conveyor 19. This simply means that a sufficient quantity of cans is placed upon the conveyor to maintain a mass of cans within the area included between the deflectors 16 and 17. The width of the conveyor 1 is such that accurate placing of the cans is not required and all that is necessary is to deposit them at some point on the conveyor standing on their ends.

They may be placed on the conveyor one at a time, or in groups, as most convenient, since if a large quantity of cans is held back by the deflectors 16 and 17, the conveyor 1 merely slides beneath the cans, carrying forward into the delivery guides 18 only a single column. Thus, for example, a whole tray of cans from the cooking or cooling operation may be inverted bodily and deposited at one time upon the conveyor 1, in which case the cans will necessarily be delivered to the conveyor in upright position. If the cans come from the cooking or cooling operation in a basket in which they are held in bulk, the basket may be inverted upon the conveyor 1, depositing the pile of cans on the conveyor and then they are righted by hand as they approach the right hand end of the conveyor. If desired, a table 22' may be arranged about the same elevation as the conveyor 1 at the left hand end of the machine, and the cans deposited either from the tray or from the basket upon this table, the cans thereafter being righted by hand and pushed on to the conveyor 1. A still further way of feeding the machine is to transfer the cans by hand from the tray or the basket directly on to the conveyor 1 in the upright position, or on to the table 22' and then slide them on to conveyor 1.

As the cans collect in contact with one another at the outlet end of deflectors 16 and 17, all tendency for the cans to jam or become wedged against one another at the entrance to the delivery guides 18 is prevented by means of the movable deflector belt 22. If two or more of the cans tend to become wedged together at the narrow outlet between the deflectors by the pressure of the other cans at the rear, the pressure of the cans against movable deflector 22 ultimately increases to such a point that the cans which are in contact with this deflector are moved backwardly to a greater or less extent thus releasing the cans which are approaching the outlet from the vicinity of the stationary deflector 16. The result is that there is a continuous discharge of cans through the delivery guides 18 on conveyor 19 in a single column, and in comparatively uniformly spaced relation.

Referring now to the modification shown in Fig. 3 of the accompanying drawings, the flexible conveyor 1 is mounted and operated as previously described. The delivery guides 18', however, are spaced farther apart so as to accommodate two cans abreast of each other. The cans are somewhat smaller in diameter than those of Fig. 1, and this machine delivers two columns of cans side by side onto the feed conveyor (which is not shown in this figure).

In this modification the side frames 6 and 7 again constitute the guides for maintaining the mass of cans on the conveyor. However, a partition 32 extends longitudinally of the machine and divides the conveyor 1 into two portions of equal area. This partition is composed of a stationary metal strip or bar which is mounted in close proximity to the upper surface of the conveyor and extends from one end to the other of the machine. Two movable deflector belts 33 and 34 which operate in all respects similar to the deflector belt 22 are mounted in symmetrical position with respect to partition 32 and serve to urge their respective groups of cans against partition 32 as the cans are moved forward by conveyor 1.

The deflector belts 33 and 34 are driven from the opposite end from belt 22, the drive being accomplished by beveled gearing 35 and 36 from a common drive shaft 37 which like shaft 30 of Fig. 1 is driven from shaft 14. The idler pulleys 38 and 39 which support the delivery ends of the belt are mounted so that the inner surfaces of the belts are approximately in line with the inner surfaces of the delivery guides 18 and 18'. Stationary deflector bars 40 and 41 which are similar to deflector bar 21 are provided for guiding the cans onto the movable deflectors 33 and 34 respectively.

The operation of the apparatus of Fig. 3 will be understood from the description and the operation of the apparatus of Fig. 1. The partition 32, although it does not move the cans transversely of the conveyor 1, serves the principal function of the stationary deflector 16, that is, it provides a surface along which the cans may slide with a minimum of resistance toward the outlet of the machine. The motion and speed of the deflector belts 33 and 34 are the same as previously described, and they not only deflect the cans transversely of the conveyor into alignment with the discharge guides 18 and 18', but in the event that two or more cans become wedged between one of the belts and the partition 32, the backward movement of the belts frees at least one of the wedged cans and allows it to be carried forward out of the machine. Inasmuch as this form of the machine is intended to operate upon smaller cans having less weight than the cans for which the machine of Fig. 1 is intended, a cover plate 43 is mounted just above the tops of the cans over the area included between the reflector belts 33 and 34. This prevents the cans from being lifted up and turned on their sides by the action of the deflectors.

In Fig. 4 there is illustrated a further modification of the machine wherein in common with the machines of Figs. 1 and 3, the cans during their reformation into a single column are acted upon by one stationary and one movable deflector or guide. Like the apparatus of Fig. 3, two columns of cans are delivered, but these columns are separate and are carried forward by separate feed conveyors, the purpose being to provide a machine which will deliver two separate columns of cans to two separate labelling machines or other places of destination. Like the apparatus of Fig. 1, there is only one body or mass of cans on the conveyor.

In the apparatus of Fig. 4, two guides 43 and 44 are mounted in spaced relation to the side frames 6 and 7 respectively, thus forming two delivery channels 45 and 46 by means of which two spaced separate columns of cans are delivered from the machine. Separate feed conveyors (not shown) convey the cans to the labelling machine or other destination.

Deflector belts 33' and 34' are mounted in a similar manner to those shown in Fig. 3, except that they are arranged to deflect the cans against the respective side frames 6 and 7. Hence the forward or driving ends of the belts 33' and 34' are comparatively close together, whereas the delivery ends are near the sides of the machine.

As the mass or body of cans on the conveyor 1 moves to the right, it is divided into two groups by a pointed deflector 47 which is mounted in stationary position in front of the deflector belts 33' and 34'. The operation of this modification in preventing wedging of the cans at the entrance to the delivery outlets 45 and 46 is the same as previously described, and in this modification also, cover plates 48 and 49 are provided to prevent the cans from being turned on their sides by the action of the deflector belts.

The word "can" as used in the appended claims is not to be construed as a limitation, but is intended to include articles of such shape and dimensions as to be handled by the machine described and claimed. It will be understood that various changes may be made in the details of construction without departing from the spirit of the invention and the scope of the appended claims.

I claim:

1. In a machine of the class described the combination of a conveyor for carrying a mass of cans standing upright but in haphazard formation, and a pair of guides mounted to act upon cans on the conveyor to rearrange the same into a column, one of said guides having a portion which is movable continuously and uninterruptedly in a direction opposite to the motion of the conveyor so as to release cans which tend to become wedged between said guides.

2. In a machine of the class described the combination of a conveyor for carrying a mass of cans standing upright but in haphazard formation, and means for converging cans on the conveyor into a column as they are carried along by said conveyor, said converging means including a vertically disposed endless belt driven continuously in a direction opposite to the travel of the cans and acting on the cans to release the same in the event that they tend to become wedged.

3. In a machine of the class described the combination of a conveyor for carrying a mass of cans standing upright but in haphazard formation, and means for converging cans on the conveyor into a column including a vertically disposed endless belt driven continuously in the direction opposite to the travel of the cans and at a higher speed than said conveyor and acting upon the cans to prevent the same from wedging in said converging means.

4. A machine of the class described comprising a frame, an endless conveyor belt mounted therein, means for driving said conveyor belt, means for urging cans on the belt together toward the central portion thereof including a vertically disposed endless belt supported in said frame between one side of the frame and the central portion of the belt and lying at an angle, means for moving said vertically disposed belt in a direction opposite to that of said conveyor belt, and outlet means in alignment with the inner end of said vertical belt.

5. A machine of the class described comprising a frame, an endless conveyor belt mounted therein, means for driving said conveyor belt, means for urging cans on the belt together towards the central portion thereof including a vertically disposed endless belt supported in said frame between one side of the frame and the central portion of the belt and lying at an angle, means for moving said vertically disposed belt in a direction opposite to that of said conveyor belt and at a higher speed than said conveyor belt, and outlet means in alignment with the inner end of said vertical belt.

6. A machine of the class described comprising a frame, a horizontally disposed conveyor belt mounted therein, means for driving same, a collector frame having an outlet opening horizontally in the direction of travel of the cans, the end of each side of said collector frame adjacent said outlet comprising a vertically disposed movable belt, means for moving said belts in a direction opposite to that of the conveyor belt, and a stationary longitudinal partition for separating the cans delivered by said collector frame to form a spaced double column.

7. A machine of the class described comprising a frame, a horizontally disposed conveyor belt mounted therein, means for driving same, a collector frame converging in the direction of travel of the cans, the rear ends of each side of said collector frame being constituted by vertically disposed movable belts, a flat member disposed horizontally to cover the space between the interior sides of said vertical belts, an outlet from said collector frame, and a stationary longitudinal partition for separating the cans delivered by said collector frame to form a spaced double column.

8. A machine of the class described comprising a framework, a horizontally disposed conveyor belt mounted therein, means for driving same, a guide extending along each side of said belt, a pointed baffle member supported in said frame over said conveyor belt with its apex pointing in the direction opposite to the travel of the cans, and a vertically disposed movable belt supported at an angle to the direction of travel of said belt and extending from the rear end of each side of said baffle.

9. A machine of the class described comprising a frame, a horizontally disposed conveyor belt mounted therein, means for driving same, a guide extending along each side of said belt, a pointed baffle member supported in said frame over said conveyor belt with its apex pointing in the direction opposite to the travel of the cans, and a vertically disposed movable belt supported at an angle to the direction of travel of said conveyor belt and extending from a point near each of said side guides to the rear end of each side of said baffle, each of said belts moving in a direction opposite to that of said conveyor belt.

10. A machine of the class described comprising a frame, a horizontally disposed conveyor belt mounted therein, means for driving same, a guide extending along each side of said belt, a pointed baffle member supported in said frame over said conveyor belt with its apex pointing in the direction opposite to the travel of the cans, and a vertically disposed movable belt supported at an angle to the direction of travel of said conveyor belt and extending from a point near each of said side guides to the rear end of each side of said baffle, and a cover member disposed horizontally over said conveyor belt between the exterior side of each of said vertical belts and the adjacent side guide.

11. A machine of the class described comprising a framework, a horizontally disposed conveyor belt mounted therein, means for driving same, a guide extending along each side of said belt, a pointed baffle member supported in said frame over said conveyor belt with its apex pointing in the direction opposite to the travel of the cans, a vertically disposed movable belt supported in said frame at the rear end of each side of said baffle and lying in the rectilinear prolongation thereof, and a vertically disposed guide plate supported in said frame parallel to the sides thereof and to the rear of each of said vertical belts.

12. In a machine of the class described the combination of a conveyor for carrying a mass of cans standing upright but in haphazard formation, and means for converging cans on the conveyor into a column as they are carried along by said conveyor, said converging means including an endless belt driven continuously in a direction opposite to the travel of the cans and acting on the cans to release the same in the event that they tend to become wedged.

13. In a machine of the class described the combination of a conveyor for carrying a mass of cans in haphazard formation and means for converging cans on the conveyor into a column as they are carried along by said conveyor, said converging means comprising a pair of cooperating guides, one of said guides being stationary and the other of said guides having imparted thereto continuous and uninterrupted motion in the direction opposite to the motion of the conveyor so as to release cans that tend to become wedged between said guides.

14. In a machine of the class described the combination of a conveyor for carrying a mass of cans in haphazard formation and means for converging cans on the conveyor into a column comprising a stationary guiding member and a can deflecting belt cooperating therewith, the portion of said belt in contact with the cans moving continuously in a direction opposite to the motion of the conveyor so as to release cans which tend to become wedged while being arranged into single column formation.

15. In a machine of the class described the combination of a conveyor for carrying a mass of cans standing upright but in haphazard formation and means for converging cans on the conveyor into a column as they are carried along by said conveyor comprising a pair of cooperating guides, one of said guides having a portion which is movable uninterruptedly in a direction opposite to the motion of the conveyor so as to release cans which tend to become wedged between said guides, and means extending between said guides above the cans to prevent the cans from being turned on their sides by the action of said movable guide portion.

16. In a machine of the class described the combination of a conveyor for carrying a mass of cans standing upright but in haphazard formation and means for rearranging cans on the conveyor into a column as they are carried along by said conveyor, comprising cooperating guides for engaging the sides of the cans, one of said guides including an endless belt driven continuously in a direction opposite to the travel of the conveyor, and a plate extending between said guides above the cans, whereby cans which tend to become wedged between said guides are released while retaining their upright position.

17. A machine of the class described comprising a frame, an endless conveyor belt mounted therein for conveying cans in haphazard formation thereon, means for driving said conveyor belt, and means above said belt for arranging cans on the belt into a column including an endless can deflecting belt supported at an angle to the travel of the conveyor belt by pulleys whose axes extend upward with respect to the surface of the conveyor belt, said can deflecting belt moving in a direction opposite to the travel of the conveyor belt, and outlet means for receiving the cans from said can deflecting belt.

WALLACE D. KIMBALL.